United States Patent Office 3,568,417
Patented Mar. 9, 1971

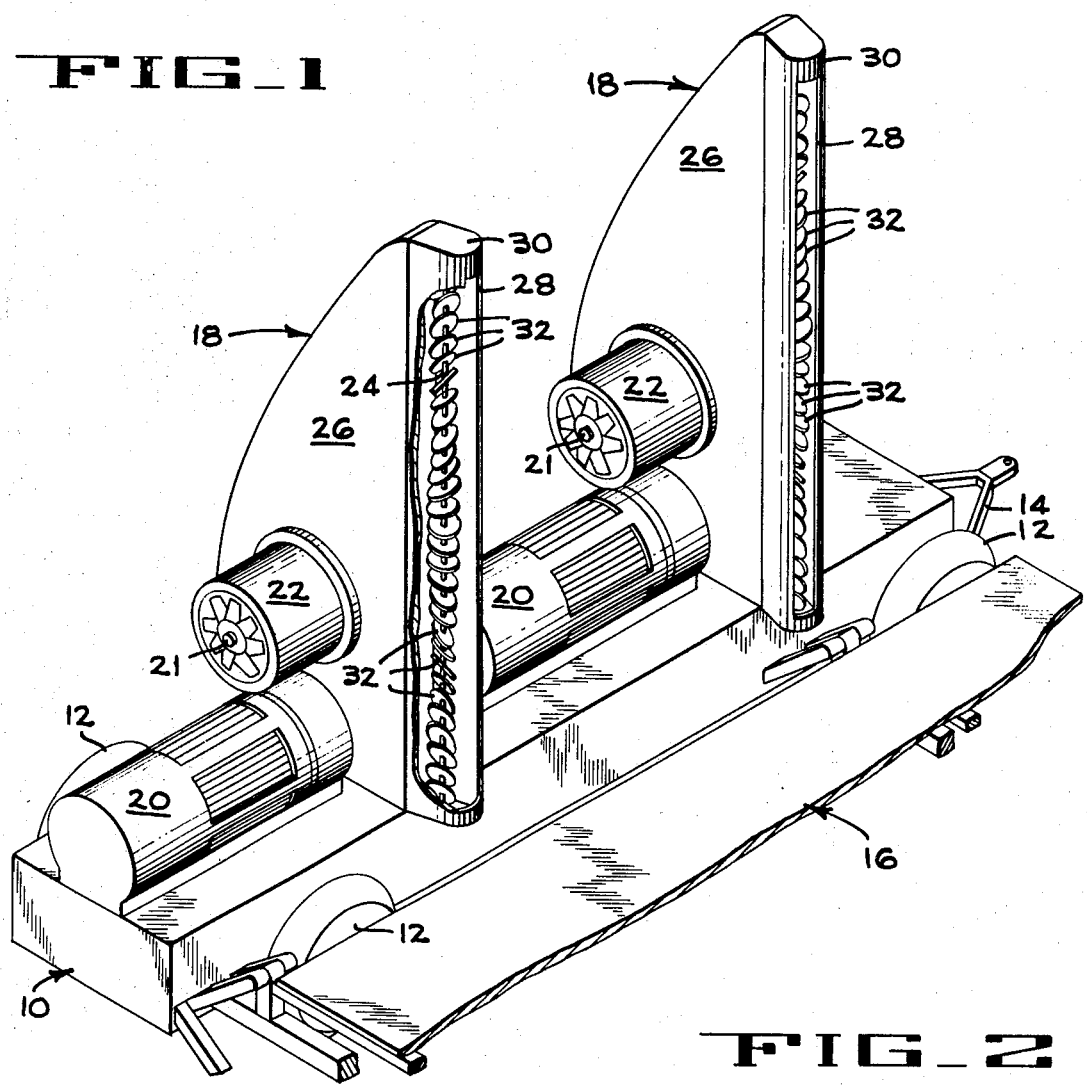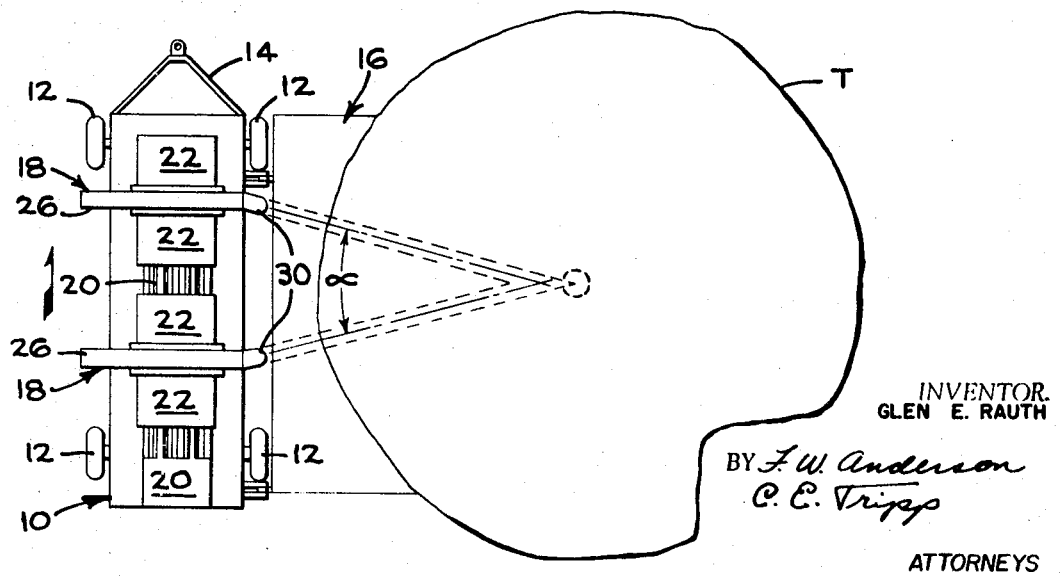

3,568,417
HARVESTING METHOD
Glen E. Rauth, Winter Park, Fla., assignor to FMC Corporation, San Jose, Calif.
Filed Mar. 3, 1969, Ser. No. 803,770
Int. Cl. A01g *19/08*
U.S. Cl. 56—1                                    4 Claims

ABSTRACT OF THE DISCLOSURE

A fruit harvesting method is provided to direct continuously swerving air at fruit trees in converging currents from two air discharge openings. The air is discharged so that as it gets further away from its source and loses energy, it is superimposed on other swerving air to re-establish the failing energy of the individual air currents and increase the harvesting effectiveness of the apparatus. The swerving air effect is accomplished through the use of wobble air vanes mounted in the air discharged openings of the apparatus, and they serve to deflect the discharged air in a swerving manner, to cause wafting of the limbs in a generally elliptical pattern resulting in the abscission of fruit from the tree.

BACKGROUND OF THE INVENTION

Field of the invention

Prior to the advent of the present invention, fruit harvesters were of many different varieties, none of which were as commercially acceptable as the subject harvester.

For many years, mechanical harvesting of fruit consisted of clamping the trunk of a fruit-bearing tree and shaking it until substantially all the fruit had fallen. This method was adequate for certain types of fruit, but for other fruit a high percentage of the fruit would be left on the tree, particularly in the case of citrus fruit. Citrus fruits are more difficult to remove than most fruits because they have long stems which absorb the shaking motion and prevent abscission of the fruit. Consequently, shaking the trunk of a citrus fruit tree was not sufficient to remove a commercially acceptable quantity of fruit.

In an attempt to make tree shaking harvesters more acceptable, the clamps were adapted for use on branches and limbs. Shaking the branches and limbs produced a larger quantity of loosened citrus fruit but was more time consuming, and more space was required around each tree for the harvesting equipment.

Attempts at blowing the fruit off the trees with extremely high velocity air met with little practical success because the air velocity required to cause abscission of the fruit also caused abscission of the tree's leaves and limbs resulting in undesired damage to the tree.

Years of testing, however, have shown that a commercially acceptable method of using air to harvest fruit is to discharge the air in such a manner that the limbs and branches supporting the fruit are caused to be moved in a predominantly vertical direction and at such a velocity that the weight of the fruit, while the fruit is in motion, will exert enough force on the stem to equal or surpass the pull force required for abscission.

An apparatus for imparting this movement to the branches is disclosed in U.S. Pat. 3,310,231, issued to L. W. Wininger and of common ownership with the present application. That apparatus consists basically of a blower with an elongate vertical air discharge opening having a plurality of slightly out-of-phase wobble plates disposed longitudinally therein. The air blast from this apparatus is very effective at removing fruit from the exposed side of trees—but in certain instances when the foliage of the tree is particularly dense, it has been found that this type of air blast does not penetrate deeply into the tree. Consequently, it does not remove an acceptable quantity of fruit from the inner or central portion. Efforts to make the apparatus more effective in the inner portions by increasing the air velocity were not successful, because the high velocity swerving air tore limbs and leaves off the tree as well as the fruit.

Further efforts to make the apparatus more effective resulted in the invention of the subject harvester which removes fruit from the inner and outer portions of the trees with equal effectiveness and without damage to any portion of the tree.

Description of the prior art

The most pertinent prior art references known to applicant are U.S. Pat. No. 3,310,231, issued to L. W. Wininger on Mar. 21, 1967, U.S. Pat. No. 2,686,990, issued to V. H. Matthews on Aug. 24, 1954, and U.S. Pat. No. 3,114,998, issued to L. Weisser on Dec. 24, 1963. The Wininger patent is discussed above in connection with the field of the present invention.

The Matthews patent discloses a horticultural spraying and dusting apparatus which directs spraying and dusting material at an object tree in converging streams so that the branches and leaves will bend and turn enough to expose all faces to the converging streams. The apparatus, however, is not designed to create a wafting motion of the limbs, it only bends and turns the branches with a motion that is effective to assure good spraying coverage without removing fruit or foliage.

The Weisser patent discloses a harvesting apparatus which can also be used for dusting and spraying trees. This apparatus directs air through a plurality of ducts so that the air is blown upwardly, laterally and downwardly upon the tree. The apparatus does not swirl the air, it merely blows the air at the tree from different directions. The apparatus is necessarily very large and cumbersome as it must be large enough to extend around three sides of the object tree. Another characteristic of the apparatus is that the air blown at the tree is blown in a vertical plane, which does not extend the exposure time of the tree limbs to the air currents as does a harvester which converges the air currents in a horizontal plane.

SUMMARY OF THE INVENTION

The present invention concerns itself generally with the harvesting of fruit but more particularly it is concerned with the removal of fruit from fruit bearing trees be converging swerving currents of discharged air on the tree.

Presently the most effective method of removing fruit from a fruit bearing tree is to cause wafting of the branches in an elliptical pattern having a dominant vertical component, so that upon upward movement of the branches, the weight of the fruit will exert a pull force on the stem sufficient to equal or surpass the pull force required for abscission of the fruit. An apparatus that develops such an elliptical movement of the branches is disclosed in the United States patent referred to above, and does so by directing the discharged air through a plurality of wobble plates which cause the air to be discharged in a continuously swerving pattern. However, as was stated above, the apparatus has a low penetrating capacity under some conditions, resulting in a low yield from the inner portions of the tree.

The subject invention is directed toward causing the branches in the inner portions of the tree to move in substantially the same pattern and with the same effectiveness as the outer branches to effect a maximum yield from the tree. It utilizes two air discharge units similar to the solitary unit disclosed in U.S. Pat. No. 3,310,231. The elongated vertical air discharge openings of the two units are directed toward each other preferably at a horizontal 30° angle of convergence. Thus, as the harvesting apparatus blows the swerving air from the two units at the object tree, the two currents of discharged air contact the outer portions of the tree separately and merge at, or short of the center of the tree to reinforce each other and carry the effective energy of the air currents into the inner portions of the tree. When the angle of convergence of the two swerving currents of discharged air is 30°, the currents merge just as their energy has fallen to the point where they no longer can separately effect the elliptical motion of the branches necessary for abscission of the fruit. The currents of swerving air augment each other upon mergence, and in effect restore the failing aerodynamic energy of the separate currents. This projects the energy of the total discharged air into the inner portions of the tree, where a single swerving current of air does not reach.

The utilization of converging air currents, to provide a substantially uniform distribution of aerodynamic energy within the confines of the tree, is necessary because there is not other known way of getting swerving air with adequate energy into the center portions of the tree without damaging the outer portions. A single current of continual swerving air discharged from the apparatus causes an increasing wafting motion, and it has been found that converging two currents of air also serves to prolong the wafting motion of the branches and in the process allow the branches to reach a maximum amplitude.

Accordingly, it is an object of the invention to provide a more effective apparatus for harvesting fruit.

Another object is to provide a fruit harvesting apparatus that removes fruit from the inner portions of a fruit bearing tree as effectively as it does from the outer portions without damaging any portion.

Another object is to provide an apparatus which removes a commercially acceptable quantity of fruit from fruit bearing trees without having to stop at each tree.

Another object of the invention is to provide a fruit harvesting apparatus that converges currents of swerving air on the fruit tree.

Still another object is to provide a method of removing a commercially acceptable quantity of fruit from a fruit bearing tree without damaging the tree.

BRIEF DESCRIPTION OF THE DRAWINGS

FIG. 1 is a schematic perspective view of the fruit harvesting of the present invention with parts broken away.

FIG. 2 is a schematic plan view of the fruit harvesting in operable relationship with a fruit bearing tree and showing paths of the swerving discharged air.

DESCRIPTION OF THE PREFERRED EMBODIMENT

The fruit harvester of the present invention includes a frame 10 supported by wheels 12, a forwardly projecting draft arm 14 that can be coupled to an orchard truck or tractor, and a fruit catching unit 16 to intercept falling fruit and guide it to a conveyor.

The fruit catching unit 16 is of the type described in the copending application of G. E. Rauth Ser. No. 701,273, which is assigned to the assignee of the present invention. It is constructed so that the harvester can move from tree to tree without having to stop for attachment of the catch plate to each successive tree. A detailed description of the catching unit is not given herein as it does not comprise an integral part of the present invention. Suffice it to say, that the unit does not inhibit or detrimentally affect the inherent desirable qualities of the subject harvester.

Mounted on the frame 10 are two swerving-air generating units generally designated 18. Each of these units is identical to the swerving-air generated unit shown and described in U.S. Pat. 3,310,231. Each unit includes a gasoline engine assembly 20 having a main transmission that is in driving engagement with the drive shaft 21 of a blower 22, positioned immediately above the engine assembly, and with a vertically disposed air deflector drive shaft 24 situated inwardly of a vertically elongate air discharge passage 28 formed in the side wall of a discharge shroud 30 of an air guide housing 26. The drive shaft 24 is coupled to the main transmission through an intermediate transmission which permits operation of the drive shaft 24 at various speeds independent of the speed of the blower 22. The blower pulls air into its cylindrical housing and moves it over guides that disperse the air into the housing 26 for movement toward the discharge passage 28.

A plurality of air deflecting vanes or wobble plates 32 are adjustably secured to the air deflector drive shafts 24 for rotation therewith. Each vane 32 is of circular shape and is mounted in oblique relation to the drive shaft 24, the spacing between each pair of adjacent vanes being substantially the same. However, the interspacing of the deflecting vanes, their phase relation to each other, and their angular relation to the drive shafts may be varied. Accordingly, the deflecting vanes 32 can be preset to intercept, and regulate to different extents, various portions of the air blasts directed outwardly through the opening 28.

As can be seen in FIG. 1, both the upper and lower surfaces of the air deflecting vanes 32 are presented to the air blasts as the vanes are revolved with the drive shafts 24. The transition of the air flow, when it ceases to be deflected by one surface of an air vane and impinges the other surface of the same vane, is very smooth because the vane area confronting the air flow during such transition continuously changes. Accordingly, each air deflecting vane 32 not only causes the air blasts to oscillate in one direction, but causes the blasts to be deflected in other directions at varying angles as the vane rotates away from its edgewise position relative to the air blast sources. The net result of the actions of the vanes 32 is to produce a swerving air curent having upward, sideward, and forward directional movements, all of which are characterized by smooth air flow transition from one direction to the other.

As mentioned above, the blowers 22 are mounted in the air guide housings 26 and generate high velocity streams of air through the housings 26 and out air discharge openings 28. The discharge openings 28 are elongated vertical openings in the curved wall of the discharge shrouds 30 which are directed toward each other at a converging angle $\alpha$ (FIG. 2) so that the currents of discharged air from the two openings 28 will merge at a preselected distance from the harvester. The air guide housings 26 are shown as being mounted generally parallel to each other, with the discharge shrouds 30 disposed at an angle thereto; however, the entire swerving air generating units could be mounted at an angle to each other. It is only important to this invention that the discharged currents of air are directed toward each other at some preselected angle of convergence $\alpha$.

The spacing between the air discharge openings 28 and their angle of convergence has a definite influence on the resultant effectiveness of the harvester. Experiments have shown that any spacing and any angle of convergence will increase the quantity of fruit removal over existing methods, but the highest percent of fruit removal occurs when the openings are spaced 39 inches apart and discharge air at a converging angle of 30° relative to each other. The machine is then towed along the path adjacent a row of trees so that the discharge air currents merge at the center or at a point just short of the center of the fruit trees T.

As the individual currents of swerving air generated from units 18 merge at a zone, a single resultant current is formed that has substantially twice the energy of either of the individual currents at that zone. In other words, the two separate swerving air currents augment each other, resulting in an increased energy level with replenished harvesting effectiveness. The point of mergence is preselected so that just as the individual swerving currents loose their respective abilities to cause abscission of the fruit, they are superimposed on each other with an immediate increase of energy and extension of the fruit removal energy.

The total aerodynamic energy of the air generated from the harvester is great enough to cause damage to the peripheral limbs and branches of a tree if emanated from a single source but not if emanated from two separate sources each of which has only half the total aerodynamic energy of the generated air. However, the total aerodynamic energy of the discharged air, when the air reaches the inner or central portion of the tree T, is substantially that which is needed for damage-free fruit removal. Therefore, by splitting the total discharged air into two separate converging currents which merge near the center of the tree, a uniform distribution of desired aerodynamic energy is obtained through the tree.

In operation, the harvester is drawn by a tractor or other suitable vehicle between the rows of fruit trees in an orchard. As the discharged air from the first swerving air generator 18 contacts the object tree, an immediate wafting of the peripheral limbs is started. Due to the effect of the swerving air on the limbs, as opposed to linear nor non-swerving air, the wafting progressively increases. When the converging discharged air from the second swerving air generator 18 contacts the object tree, the wafting of the peripheral limbs of the tree continues and the limbs in the central portion of the tree begin to waft. Therefore, the effect of the second air generator 18 is twofold; it prolongs wafting of the peripheral limbs and supplies the aerodynamic energy necessary to remove fruit from the central portion of the tree when combined with the discharged air from the first air generator.

The unique fashion in which air is discharged from units 18 causes the limbs of the trees to move in an elliptical pattern having a dominant vertical movement. When the limbs attain their maximum amplitude the pull force exerted on the fruit during an upward motion is equal to or greater than the pull force necessary for abscission of the fruit. Consequently, the fruit is pulled from the tree by the movement of the limbs and drops to catch plate 16 where it is guided onto a conveyor and conveyed to a transfer vehicle for removal from the orchard.

The design of the harvester is such that it is only necessary to pass by two sides of the fruit trees for a highly acceptable fruit removal. Therefore, the trees do not have to be spaced at great distances and more trees can be planted in an orchard. Also, the harvester is adapted for use with any size fruit tree because there is no part of the harvester which extends above the tree and which could possibly be a detriment when harvesting large trees.

It has been found that air velocities at the point of discharge from the shroud 30 must be beeween 80 and 150 m.p.h. and that the vanes 32 must revolve at a speed from 40 to 100 oscillations per minute to permit the matching of the swerving motion speed with the natural response of the various size citrus tree branches.

Although the best mode contemplated for carrying out the present invention has been herein shown and described it will be apparent that modification and variation may be made without departing from what is regarded to be the subject matter of the invention.

What is claimed is:

1. The method of removing fruit from a fruit bearing tree comprising the steps of pointing at least two horizontally displaced sources of air toward the said tree so that air discharged from the sources will converge within the confines of the tree, wobbling air vanes in front of the said air sources to give subsequently discharged air vertically undulating swerving motion, and discharging air at the said tree through the said vanes to cause wafting of the limbs of the said tree and consequently removal of fruit from the tree.

2. The method of claim 1 wherein the said air sources are pointed toward the tree at a converging angle of 30°.

3. In a method of sustaining the generally elliptical wafting movement of the limbs of a citrus tree resulting from a blast of swerving air being moved past the tree and directed into the tree, the improvement which comprises directing a second horizontally displaced blast of air into the tree at an angle to the first blast so as to converge with the first blast adjacent the center of the tree, and moving the said second air blast past the tree at the same speed as the first air blast.

4. In a method of harvesting fruit from citrus trees wherein a blast of swerving air is directed into each tree to set up a generally elliptical wafting motion of the limbs of the tree to cause abscission of the fruit, the improvement which comprises the step of directing a horizontally displaced second blast of swerving air into the tree at an angle of convergence with the first blast of approximately 30 degrees and with the intersection of the blasts being adjacent the center of the tree.

References Cited
UNITED STATES PATENTS

| | | | |
|---|---|---|---|
| 2,297,110 | 9/1942 | Parker | 239—77 |
| 2,925,222 | 2/1960 | Spreng | 239—77 |
| 3,310,231 | 3/1967 | Wininger | 56—328 |
| 3,369,754 | 2/1968 | Wolford | 239—78X |
| 3,409,221 | 11/1968 | Patterson | 239—77X |

LOUIS G. MANCENE, Primary Examiner

J. N. ESKOVITZ, Assistant Examiner

U.S. Cl. X.R.

56—328; 230—274